United States Patent

Kuno

[15] 3,707,211

[45] Dec. 26, 1972

[54] FRICTION DISC CLUTCH FOR VEHICLES

[72] Inventor: Syozo Kuno, Kariya, Japan

[73] Assignee: Aisin Seiki Kabushiki Kaisha, Kariya-shi, Japan

[22] Filed: Dec. 18, 1970

[21] Appl. No.: 99,387

[30] Foreign Application Priority Data

Dec. 20, 1969 Japan ..................... 44/102781

[52] U.S. Cl............192/113 A, 192/89 B, 192/99 A, 85/8.3
[51] Int. Cl..............................................F16d 13/60
[58] Field of Search....192/89 B, 113 A, 99 A, 70.30, 192/70.29; 85/8.3

[56] References Cited

UNITED STATES PATENTS

| | | |
|---|---|---|
| 3,340,974 | 9/1917 | Maucher....................192/89 B |
| 2,870,893 | 1/1959 | Palm.........................192/113 A |
| 1,683,624 | 9/1928 | Murphy....................192/70.29 |
| 3,094,344 | 2/1963 | Varga...........................85/8.3 |
| 3,227,030 | 1/1966 | Preziosi et al. .............85/8.3 |

Primary Examiner—Benjamin W. Wyche
Assistant Examiner—Randall Heald
Attorney—Berman, Davidson and Berman

[57] ABSTRACT

A motor vehicle friction clutch of the type which includes an output shaft, a flywheel secured to a drive shaft, a clutch cover connected to the flywheel, a pressure plate, a dish spring interposed between the clutch cover and the pressure plate, and a clutch disc. Cooling air passages for cooling the dish spring and the pressure plate are provided around both sides of the dish spring by a number of ventilating recesses made on the annular inner edge of the clutch cover and a number of projections made on the annular circumferential edge of the pressure plate.

7 Claims, 9 Drawing Figures

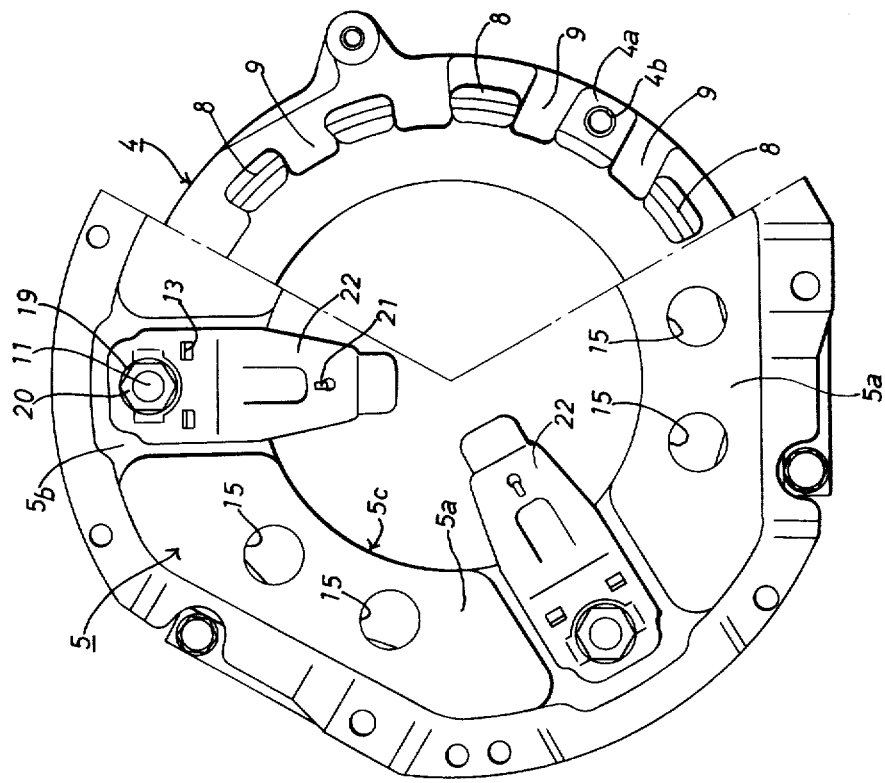
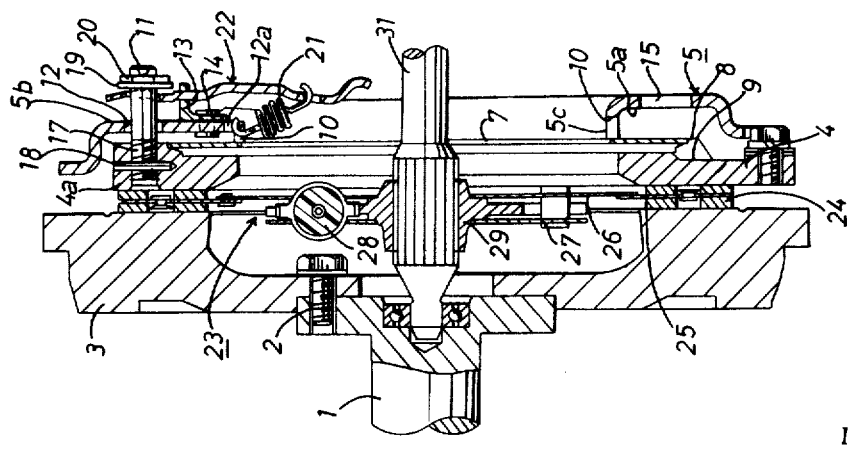

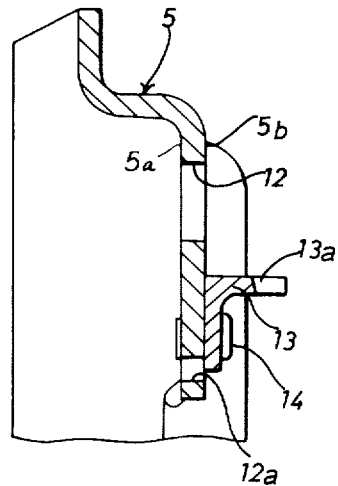
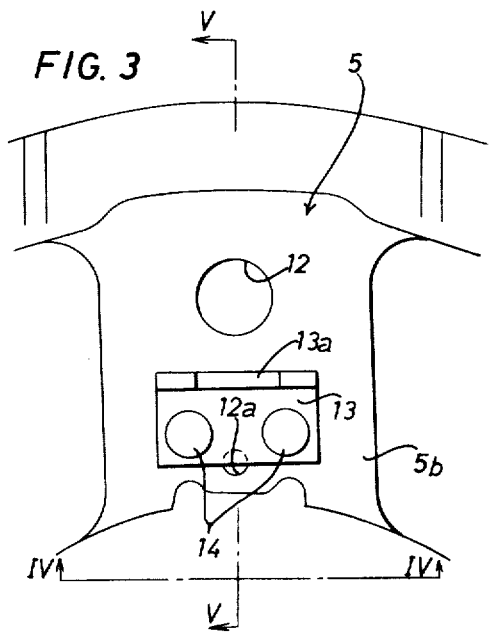
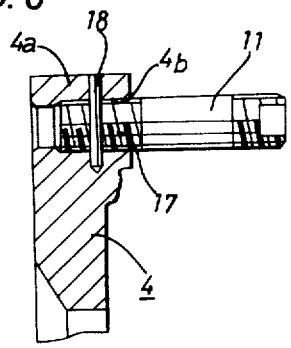
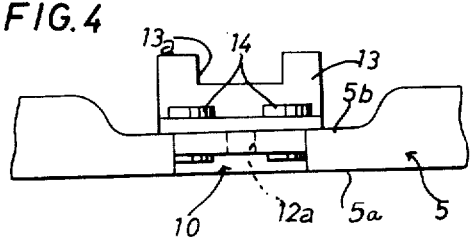
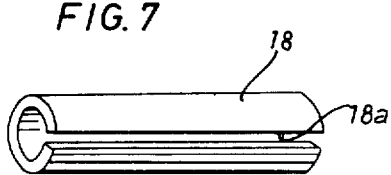
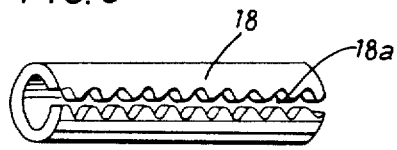
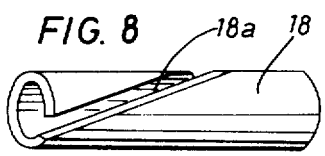

FRICTION DISC CLUTCH FOR VEHICLES

The present invention relates to a friction disc clutch for motor vehicles, and particularly to an improvement of the friction disc clutch which comprises a flywheel secured firmly on the drive shaft of an engine. A clutch cover is fixedly connected to the flywheel, and a pressure plate is mounted in the clutch cover on adjusting bolts threaded adjustably in the annular circumferential shoulder of the pressure plate and jutting out through the clutch cover. A dish spring is interposed between the pressure plate and the clutch cover for producing the desired pressing forces, and a clutch disc is connected to an output shaft to transmit the rotation torque of the drive shaft to the output shaft when the clutch disc is pressed between the pressure plate and the flywheel.

Conventional friction disc clutches of the above-mentioned type have the drawback that the lack of cooling for the dish spring and the pressure plate influences greatly the maintenance of the most desirable engagement of the friction disc clutch as well as the life of the friction disc clutch.

An important object of the present invention is, therefore, to provide a friction disc clutch having cooling air passages formed around the dish spring interposed between the pressure plate and the clutch cover so as to prevent the dish spring from overheating and reducing its resilient effect thus increasing the life of the friction clutch.

Another important object of the present invention is to provide a friction clutch which has air passages around the dish spring with no recess in the dish spring to ease manufacturing of the dish spring.

A further important object of the present invention is to provide a friction clutch in which the adjusting bolt is secured to the pressure plate to maintain better friction effect between the pressure plate and the clutch disc.

In accordance with one embodiment of the present invention, there is provided a friction disc clutch which comprises a number of air passageways formed on both sides of the dish spring by a number of ventilating recesses provided on the annular inner edge of the clutch cover and a number of projections provided on the annular circumferential edge of the pressure plate to jut out radially and axially. Both sides of the dish spring are supported by the annular inner edge of the clutch cover and the projections of the pressure plate.

The above-mentioned and other objects and advantages of the present invention will appear more clearly from the following descriptions, especially when read in light of the accompanying drawings, in which FIG. 1 is a vertical sectional view of a friction clutch in accordance with the present invention;

FIG. 2 is a front view of the friction clutch shown in FIG 1, the right-hand portion of this figure showing the friction clutch broken open with the cover removed;

FIG. 3 is a fragmentary front view showing a portion where a release lever is installed in the friction clutch shown in FIG. 1;

FIG. 4 is a side view when seen from the IV — IV line in FIG. 3 looking in the direction of the arrows;

FIG. 5 is a cross sectional view taken along the line V — V of FIG. 3 looking in the direction of the arrows;

FIG. 6 is a partial cross-section showing the securing construction of an adjusting bolt;

FIG. 7 is a perspective view of one of the roll pins;

FIG. 8 is a perspective view of another of the roll pins; and

FIG. 9 is a perspective view of still another roll pin.

Referring now to the drawings in detail, the clutch arrangement illustrated therein comprises a flywheel 3 which is connected by a bolt 2 to a drive shaft 1 driven by an engine. The flywheel 3 has a clutch cover 5 secured firmly on the annular flange thereof by bolts not shown in the drawings. As best shown in FIG. 2, the clutch cover 5 is designed approximately in an annular shape and has opposed surfaces 5a and 5b arranged parallel with the flywheel 3. Opening through the parallel surfaces 5a and 5b are ventilating holes 15 and a through hole 12 to provide access to an adjusting bolt 11.

A number of ventilating notches 10 are formed on the inner circumferential edges 5c of the cover 5 between the parallel surfaces 5a and 5b. A pressure plate 4 of an approximate annular shape is mounted in the clutch cover 5 in such a way as to be rotatable with and axially displaceable with respect to the flywheel 3. A number of projections 8 are distributed on the annular circumference of the pressure plate 4 and axially project outwardly therefrom. An adjusting bolt 11 is provided to regulate the height of a release lever 22 and to adjust the space inbetween clutch facing 24 and the pressure plate 4.

The adjusting bolt 11 is first put through the through hole 12 of the clutch cover 5 and, as shown in detail in FIG. 6, the male screw end 17 thereof is threaded into the female screw hole 4b in a boss 4a on the back side of the pressure plate 4. A blind female screw may replace the female screw hole 4b. The male screw portion 17 of the adjusting bolt 11 is locked against rotation within the female screw hole 4b by a roll pin 18 inserted in from the outer circumferential side of the pressure plate 4 in a radial direction.

The roll pin 18 is designed with its outer diameter, before insertion, larger than the inner diameters of the receiving holes drilled in the pressure plate 4 and the adjusting bolt 11. A slot or opening 18a is cut through the roll pin 18 along the axial line thereof so as to give the roll pin 18 outward resilient force. The shape of the slot in the roll pin 18 may be selected from those shown in FIG. 7, 8 and 9, or others. The larger outer diameter and outward resilient force of the roll pin 18 prevent disengagement of the roll pin 18 caused by vibration and/or centrifugal force.

The release lever 22 is supported at one end thereof on the top end of the adjusting bolt 11 by a washer 19 and a nut 20 and at the other portion thereof by a recess 13a in a receiver 13 secured to the surface 5b of the clutch cover 5 by means of rivets 14. A tension spring 21 is stretched between a hole 12a of the clutch cover 5 and the base end of the release lever 22 to hold the release lever 22 against movement in an axial direction, Thus, the pressure plate 4 is axially displaceably mounted in the clutch cover 5 through the adjusting bolt 11 and the release lever 22.

A dish spring 7 biases the pressure plate 4 toward the flywheel 3, having the outer circumference thereof supported by the projections 8 of the pressure plate 4 and the inner circumference thereof supported by the inner circumferenctial edge 5c of the clutch cover 5. Thus, a number of air passageways are formed on both sides of the dish spring 7 by grooves 9 made between the projections 8 of the pressure plate 4 and the notches 10 and the ventilating holes 15 of the clutch cover 5.

A clutch disc 23 includes a clutch facing 24, a disc spring 25, a disc plate 26, a subplate 27 and a resilient member 28 and is connected through a clutch hub 29 to an output shaft 31 and is movable only in an axial direction. The clutch disc 23 is interposed between the flywheel 3 and the pressure plate 4 to transmit rotational torque of the drive shaft 1 to the output shaft 31.

In a friction clutch arrangement of the above-mentioned construction, by moving a release bearing (not shown) to the left in FIG. 1, the release levers 22 are engaged conventionally and pivoted about their respective fulcrums 13. This moves the adjusting bolts 11 together with the pressure plate 4 connected to the adjusting bolts 11 by roll pins 18. As a result, the pressure plate 4 moves to the right against the biasing force of the dish spring 7 and the clutch facing 24 of the clutch disc 23 is moved away from the frictional surface of the pressure plate 4 so that the rotation of the flywheel 3 is not transmitted to the output shaft 31. By retracting the release bearing, the pressure plate 4 is pressed toward the clutch facing 24 by means of the biasing force of the dish spring. This causes frictional driving engagement between the drive shaft 1 and the output shaft 31.

Thus, the pressure plate 4 is friction heated by slippage and by frequent engagement and disengagement of the clutch disc and the pressure plate 4. The heat, however, is dissipated efficiently through the air passageways which produce good and smooth air-circulation to send air outwardly along the circumferences of the dish spring 7 from the center portion of the clutch cover 5. The increased cooling effect for the pressure plate lessens the fading and abrasion of the clutch facings, thus increasing the life of the clutch.

Another advantage in the present invention is to ease manufacture of the dish plate since no notch is necessary on the dish spring.

Although the present invention has been illustrated and described in connection with a specific embodiment, it should be understood that various modifications and adaptations may be resorted to without departing from the scope and spirit of the present invention.

What is claimed is:

1. In a friction disc clutch for motor vehicles of the type which includes an output shaft, a flywheel secured to an engine drive shaft and having a peripheral annular flange, an annular clutch cover connected to the free end face of said flange and having surfaces substantially parallel to said flywheel and an inturned inner edge substantially coaxial with said flywheel, a pressure plate with an annular circumferential edge mounted in said clutch cover, an annular dish spring supported at the outer and inner circumferences thereof respectively by said annular circumferential edge of said pressure plate and the annular inner edge of said clutch cover, and a clutch disc positioned between said flywheel and said pressure plate, said clutch disc conducting frictional driving engagement between said drive shaft and said output shaft when pressed with said flywheel and said pressure plate by means of resilient force of said dish spring, the improvement comprising a number of projections formed on said annular circumferential edge of said pressure plate to provide first air passage means between said annular circumferential edge of said pressure plate and one side of said dish spring, and a number of ventilating holes disposed radially through said inturned inner edge of said annular clutch cover to provide second air passage means at the other side of said dish spring.

2. A friction disc clutch as claimed in claim 1, wherein said dish spring comprises an annulus whose inner peripheral edge lies in a smooth uniform curve free of sharp changes of direction.

3. A friction disc clutch as claimed in claim 2, wherein a number of ventilating holes are formed through one of said parallel surfaces of said clutch cover and whose bores extend parallel to the axis of the flywheel to provide third air passage means.

4. A friction disc clutch as claimed in claim 3, further comprising fourth air passage means formed between an annular outer edge of said clutch cover and said pressure plate.

5. A friction disc clutch according to claim 1, wherein a plurality of lever means support said pressure plate from said clutch cover, each of said lever means including a bolt adjustably threaded in a screw hole formed in and parallel to the axis of the pressure plate body and extending axially through a hole in said clutch cover, a roll pin pressed radially into said pressure plate body through its outer peripheral edge into said screw hole to lock said adjusting bolt against rotation, a release lever movably held on a fulcrum bracket secured to said clutch cover by said adjusting bolt near one end of the lever, and a spring stretched between said clutch cover and the other end of said release lever.

6. A friction disc clutch as claimed in claim 7, wherein said screw holes provided on said pressure plate body for adjusting are blind female screw holes.

7. A friction disc clutch as claimed in claim 7, wherein said roll pins are resilient members each having a generally hollow cylindrical shape and each being provided with a slot extending from one end to the other.

* * * * *